US008576402B2

(12) United States Patent
Momtahan

(10) Patent No.: US 8,576,402 B2
(45) Date of Patent: Nov. 5, 2013

(54) OPTICAL NAVIGATION WITH SPECULAR REFLECTION BLOCKING

(75) Inventor: Omid Momtahan, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 488 days.

(21) Appl. No.: 12/841,791

(22) Filed: Jul. 22, 2010

(65) Prior Publication Data

US 2012/0019832 A1   Jan. 26, 2012

(51) Int. Cl.
*G01C 3/08* (2006.01)
*G01N 21/47* (2006.01)

(52) U.S. Cl.
USPC ........ 356/446; 356/3.02; 356/3.03; 356/3.04; 356/3.05; 356/3.06; 356/3.07; 356/3.08; 356/3.09; 356/3.11; 356/3.12; 356/3.13; 356/3.14; 356/3.15; 356/3.16; 356/4.01; 356/4.02; 356/4.03; 356/4.05; 356/4.07

(58) Field of Classification Search
USPC ................................. 356/440–449
See application file for complete search history.

(56) References Cited

U.S. PATENT DOCUMENTS

| | | | |
|---|---|---|---|
| 4,859,064 A | 8/1989 | Messerschmidt et al. | |
| 6,151,086 A * | 11/2000 | Fergason | 349/5 |
| 6,530,283 B2 | 3/2003 | Okada et al. | |
| 6,686,602 B2 | 2/2004 | Some | |
| 6,737,636 B2 | 5/2004 | Dietz | |
| 7,435,942 B2 | 10/2008 | Lang | |
| 2003/0080941 A1 * | 5/2003 | Schkolnik | 345/163 |
| 2008/0137061 A1 * | 6/2008 | Rush | 356/4.04 |
| 2009/0103052 A1 | 4/2009 | Crill | |
| 2009/0108175 A1 * | 4/2009 | Grot | 250/206.1 |

* cited by examiner

*Primary Examiner* — Tarifur Chowdhury
*Assistant Examiner* — Sunghee Y Gray

(57) ABSTRACT

A system for optical navigation includes a light source and an imaging system. The light source illuminates a navigation surface. The navigation surface reflects light from the light source. The imaging system is located approximately within a path of the reflected light. The imaging system includes a lens, a mask, and an image sensor. The lens receives reflected light from the navigation surface. The lens focuses a specular portion of the reflected light to a focus region. The mask is located at approximately the focus region. The mask filters out substantially all of the specular portion of the reflected light and passes at least some of a scatter portion of the reflected light outside of the focus region. The image sensor generates a navigation signal based on the scattered portion of the light that passes outside the focus region and is incident on the image sensor.

18 Claims, 7 Drawing Sheets

US 8,576,402 B2

OPTICAL NAVIGATION WITH SPECULAR REFLECTION BLOCKING

BACKGROUND

Conventional optical navigation systems, such as an optical mouse for a computer, collect light reflected at a specular reflection angle. Highly reflective surfaces do not scatter very much light and can produce a bright (i.e., high intensity) image. When used on highly polished or glossy surfaces (e.g., glass), the signal intensity of the reflected light is greater than that of a non-glossy surface. However, the contrast of the image is low because of the high intensity of the specular reflection signal. The relatively low contrast makes it difficult to distinguish individual features on the surface and, hence, makes it difficult to determine movements of the device based on relative movements of the features in sequential navigation images.

FIG. 1 illustrates an arrangement for a conventional optical navigation device 10. The conventional optical navigation device 10 includes a light source 12 and an image sensor 14. The light source 12 directs light toward a reflective navigation surface 16. The incident light approaches the reflective navigation surface 16 at an angle of incidence. The light reflects off of the reflective navigation surface 16 at an angle of reflection, which is equal to the angle of incidence, because of the reflective nature of the reflective navigation surface 16. The image sensor 14 receives the reflected light and, over time, generates a sequence of images of the reflective navigation surface 16. The conventional optical navigation device 10 also includes an imaging lens 18 to more or less image the illuminated area on the navigation surface onto the image sensor 14.

Due to the specular nature of the reflective navigation surface 16, some of the light that is incident on the reflective navigation surface 16 is specularly reflected toward the image sensor 14. Also, the specularly reflected light does not exhibit a significant pattern because of the uniformity (i.e., low contrast) of the reflective navigation surface 16. Therefore, the high intensity of the specular reflection and the low contrast of the resulting image based on that reflected light render relatively little detail for use in determining movements of the conventional optical navigation device 10. This lack of detail in the resulting images makes it difficult to accurately determine the movements of the conventional optical navigation device 10 relative to the reflective navigation surface 16.

SUMMARY

Embodiments of a system are described. In one embodiment, the system is a system for optical navigation. The system includes a light source and an imaging system. The light source illuminates a navigation surface. The navigation surface reflects light from the light source. The imaging system is located approximately within a path of the reflected light. The imaging system includes a lens, a mask, and an image sensor. The lens receives reflected light from the navigation surface. The lens focuses a specular portion of the reflected light to a focus region. The mask is located at approximately the focus region. The mask filters out substantially all of the specular portion of the reflected light and passes at least some of a scatter portion of the reflected light outside of the focus region. The image sensor generates a navigation signal based on the scattered portion of the light that passes outside the focus region and is incident on the image sensor. Other embodiments of the system are also described.

Embodiments of an apparatus are also described. In one embodiment, the apparatus is an apparatus for filtering light for optical navigation. The apparatus includes a lens, a mask, and an image sensor. The lens focuses a specular portion of the reflected light to a focus region. The mask at approximately the focus region filters substantially all of the specular portion of the light and passes at least some of a scattered portion of the light outside of the focus region. The image sensor generates a navigation signal based on the scattered portion of the light that passes outside of the focus region and is incident on the image sensor. Other embodiments of the apparatus are also described.

Embodiments of a method are also described. In one embodiment, the method is a method for optical navigation. The method includes generating light at a light source. The method also includes directing the light to a navigation surface. The method also includes focusing a specular reflected portion of the light at a focus region. The method also includes filtering the specular reflected portion of the light at approximately the focus region and passing a scattered portion of the light outside of the focus region. The method also includes detecting the scattered portion of the light at an image sensor. The method also includes generating a navigation signal based on the scattered portion of the light. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
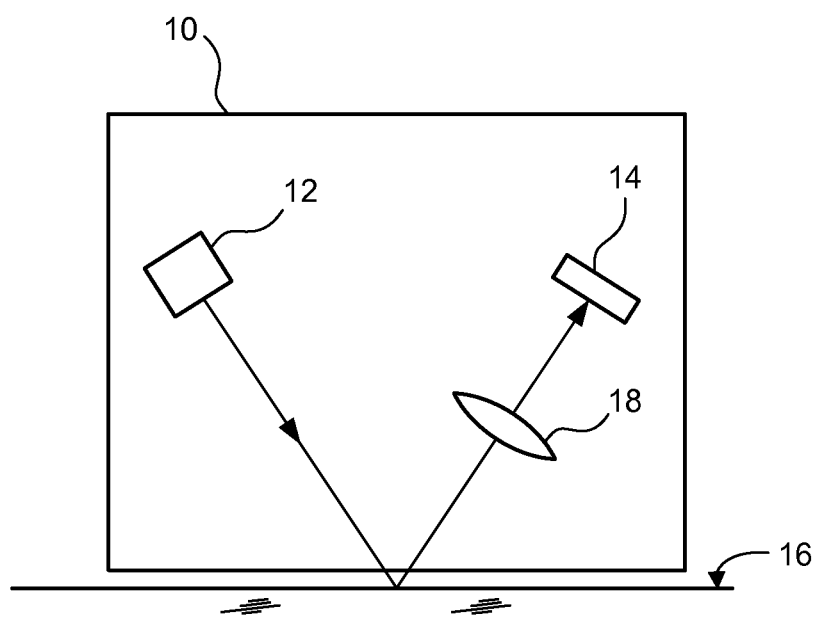
FIG. 1 depicts of an arrangement for a conventional optical navigation device.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments utilize a mask or a stop to filter, or stop, at least some of the specular light reflected from a navigation surface. More specifically, the mask is located in the path of the reflected light beam at or close to a plane where the specular reflection has its minimum cross section. For collimated illumination, the plane is approximately at the focal plane (or Fourier plane) of a lens. At such a plane, the light exhibits characteristics that allow for the mask to filter out most or substantially all of the specular light while passing some or most of the scattered light. Hence, only a portion of light reflected by a surface is passed to an image sensor to detect relative motion of the optical navigation device, while the remainder of the reflected light is filtered. In some embodiments and depending on the navigation surface, from a few percentages up to close to 100% of the reflected light is filtered by the mask.

In general, the specular reflection could be blocked at different stages when the light is collected by the collection optics (or in a special case, the imaging lens) on the sensor. For example, it could be blocked even before entering the collimation optics by utilizing the input aperture of the collection optics out of the path of the specular reflection. The illumination beam has usually a large cross section to cover a relatively large area on the navigation surface. Thus, the specular reflection has also a relatively large cross section. Arranging the input aperture of the collection optics to be out of the optical path of the specular reflections places some minimum requirements on the size of the system. For example, for an incident beam that is close to collimation, the specular reflection could be confined to a very small region at or close to the focal plane of the lens (Fourier plane). At that plane the specular reflection has its minimum footprint. By placing a small mask at or near that region, the specular reflection is blocked while a portion of the scattered light is passed through. While it is less bulky to filter out the specular reflection in this arrangement, the efficiency of collected scattered light is also higher compared to blocking the specular reflection at other locations. In general, if the illumination beam is not collimated, the collection optics could be designed to have a plane behind the lens at which the specular reflection has its minimum cross section. At that location, the blocking of the specular reflection could be easily achieved using a small mask. If the system is designed in a way that the scattered light is not totally blocked by the mask, a portion of the scattered light could pass and reach the imaging sensor.

In general, embodiments of the navigation input device with a mask to block the specular reflection at or close to its minimum cross section are implemented in optical mice or other optical navigation input devices. In particular, embodiments with the mask or a filter to block the specular reflection may be used in compact optical navigation input devices to track movements on glass or other shiny surfaces. In some embodiments, the filter is formed with a non-transparent material forming an optical stop on a surface of a transparent material. In other embodiments, the filter is formed by suspending the stop in the path of the reflected light with small mechanical supports (for example, one or more spokes). In other embodiments, the filtering is achieved by modifying the optical path of the specular portion of the reflected beam from the rest of the reflected beam by deflecting one portion and passing the rest or by deflecting each portion into a separate direction.

Advantages of some of the embodiments described below may include the ability to have the optical sensor placed in a location that would typically be within the path of the specular light. Because the optical sensor may be placed in a location that would typically be within the path of the specular light, the optical sensor may also be disposed closer to the navigation surface than conventional devices. Additionally, the ability to filter out the high intensity specular light at its minimum beam cross section and after entering the collection optics allows for an increased aperture size or the removal of an input aperture. An increased aperture size allows the optical sensor to collect more light and, therefore, provide a better signal to noise ratio for generation of a navigation signal. Also, the optical navigation device may be used on various surfaces, including shiny or glossy surfaces. Additionally, the relatively small size requirement of the mask blocking the specular reflection allows a smaller package size than conventional devices.

Figure 2:
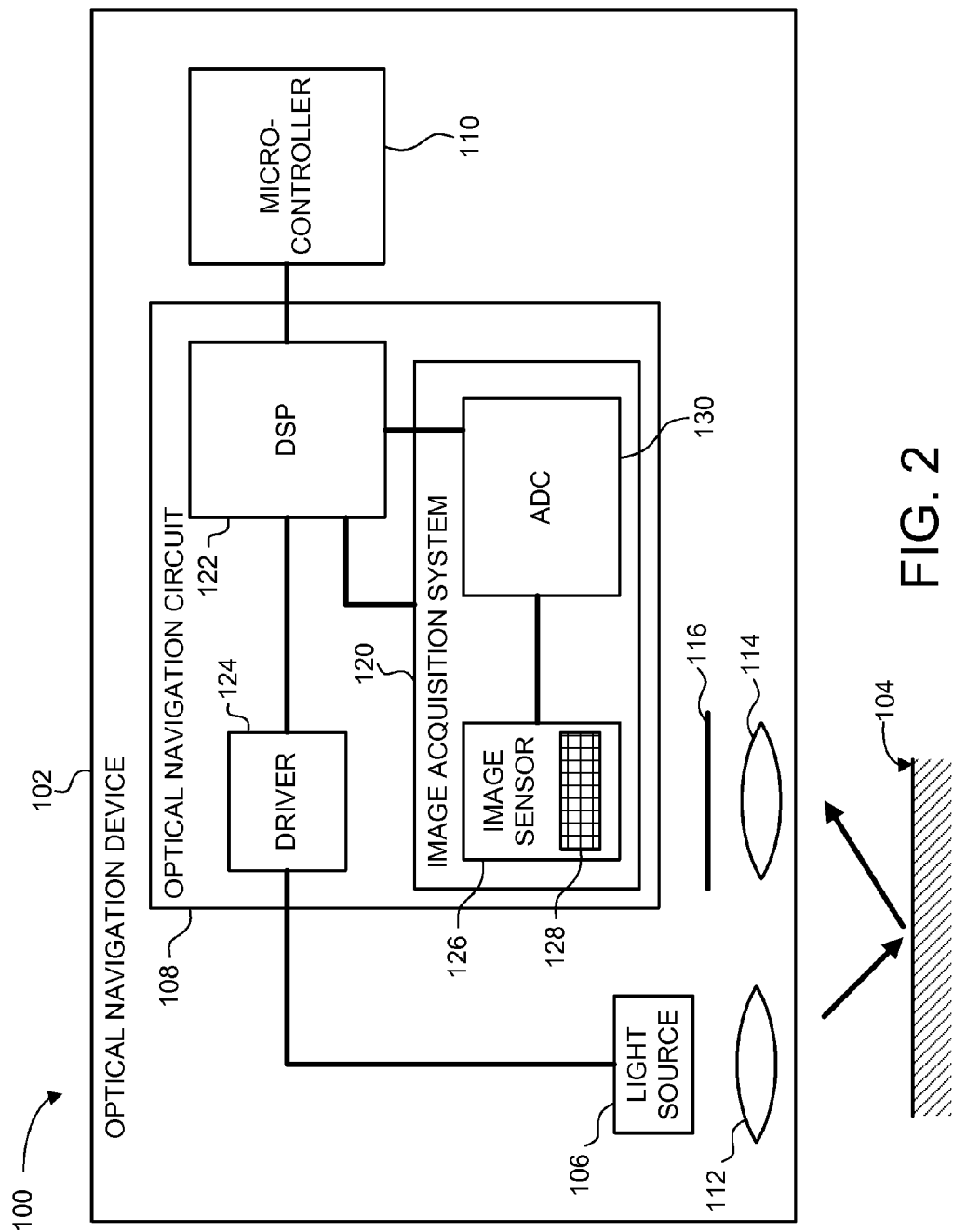
FIG. 2 depicts a schematic block diagram of one embodiment of an optical navigation system.

FIG. 2 depicts a schematic block diagram of one embodiment of an optical navigation system 100. The illustrated optical navigation system 100 includes an optical navigation device 102 relative to a navigation surface 104. In general, the optical navigation device 102 illuminates portions of the navigation surface 104 in order to generate images of the illuminated portions or features at the navigation surface 104. More specifically, the optical navigation device 102 moves relative to the navigation surface 104 and generates one or more navigation signals representative of the movement of the optical navigation device 102 relative to the navigation surface 104. Hence, the navigation surface 104 also may be referred to as an illumination surface. Additionally, since the navigation surface 104 is used to track the movement of the optical navigation device 102, the navigation surface 104 also may be referred to as a tracking surface.

In order to illuminate the navigation surface 104, the optical navigation device 102 emits light which is at least partially reflected by the navigation surface 104. The optical navigation device 102 detects at least a portion of the reflected light and processes the detected portion to generate the navigation signals. Examples of how the navigation signals may be generated are described in more detail below.

The navigation surface 104 may be any type of surface and may include one or more types of material compositions. Examples of typical navigation surfaces 104 include wood, stone, or plastic laminate desktops, as well as fabric or other textured navigation pads (e.g., a mouse pad). Some types of navigation surfaces 104 are highly specular so that approximately all of the light incident on the navigation surface 104 is specularly reflected and only a very small portion of it is scattered in other directions. One example of a highly reflective or specular navigation surface 104 is a glass surface. Other embodiments may include other types of specular navigation surfaces 104.

The distance between the optical navigation device 102 and the navigation surface 104 may vary depending on the application for which the optical navigation device 102 is used. In surface navigation applications, the optical navigation device 102 may be relatively close to the navigation surface 104. For example, a housing of the optical navigation device 102 may be in direct, physical contact with the navigation surface 104. Alternatively, stand-off structures (not shown) attached to the housing of the optical navigation device 102 may be in direct, physical contact with the navigation surface 104. In other embodiments, the optical navigation device 102 may be within a few centimeters or inches of the navigation surface 104, without being in direct, physical contact with the navigation surface 104. In contrast, in free space navigation applications, the optical navigation device 102 may be relatively far from the navigation surface 104. For example, the optical navigation device 102 may operate outside of the surface navigation optical range.

The depicted optical navigation device 102 includes a light source 106, an optical navigation circuit 108, and a microcontroller 110. The optical navigation device 102 also includes optical elements 112 and 114, and a mask or filter 116. Other embodiments may include fewer or more components. For example, some embodiments of the optical navigation device 102 may exclude one or more of the optical elements 112 and 114, while other embodiments include additional optical elements.

In one embodiment, the light source 106 is an incoherent light source. In another embodiment, the light source 106 is a coherent light source. In one embodiment, the light source 106 is a laser. For example, the light source 106 may be a vertical cavity surface emitting laser (VCSEL) or a light emitting diode (LED). Alternatively, the light source 106 may be another type of laser or other light source. In some embodiments, the light emitted by the light source 106 is collimated. In other embodiments, the light source 106 emits light that is not collimated.

In general, the light source 106 directs light toward the navigation surface 104 to illuminate a portion of the navigation surface 104. If the navigation surface 104 is substantially specular, then the light beam reflects off of the navigation surface 104 along a specular reflection path. The incident light (i.e., the light traveling toward the navigation surface 104) may pass through the optical element 112. Similarly, the reflected light beam (i.e., the light reflected from the navigation surface 104) may pass through the optical element 114. Additionally, the light from the optical element 114 passes through the mask or the filter 116. Specific functionality of the optical elements 112 and 114 and the mask 116 is described in more detail below.

If there are any surface reflection features such as irregularities, dust, or scratches at the navigation surface 104, then some of the incident light may be reflected and scattered along one or more scattered light paths which may be slightly or greatly offset from the specular reflection path. Essentially, any path which is not the specular reflection path may be considered a scattered light path. Although there may be many types of surface reflection features which scatter the reflected light in different directions, some examples of surface reflection features include particles (e.g., dust) on the navigation surface 104, aberrations (e.g., scratches) in the navigation surface 104, irregularities at the navigation surface 104, as well as imperfections below or beneath the navigation surface 104. In the case of diffuse reflection off of a surface reflection feature, the reflected light may be diffused, or scattered in substantially all directions.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light beam that is emitted toward the navigation surface 104. Light from the navigation surface 104 is reflected back into the optical navigation device 102.

In some embodiments, the optical navigation device 102 includes an optical element 114. The optical element 114 produces an optical effect on the light. The depicted image acquisition system 120 includes an image sensor 126 and an analog-to-digital converter (ADC) 130. The image sensor 126 includes a pixel array 128 of distinct photosensors, or photodetectors. Each photosensor is referred to as a picture element (pixel). As an example, the image sensor 126 may include a 16×16 or 32×32 array of distinct photodetectors configured to detect light that is reflected from the navigation surface 104. However, the image sensor 126 does not need to be an array organized by a power of two. In one embodiment, the image sensor 126 generates a plurality of electrical signals corresponding to light intensity of the reflected light at the pixel array 128. Each of the electrical signals corresponds to one of the picture elements (or pixels) of the pixel array 128. At least a portion of the light beam reflected from the navigation surface 104 is incident on the pixel array 128. In one embodiment, the optical element 114 facilitates resolution of microscopic surface images at the pixel array 128. Alternatively, the optical element 114 facilitates resolution of more distant objects in a free space navigation environment. Additionally, the optical element 114 may be used to collimate or focus the specular reflection at or near the mask 116. Additionally, the optical element 114 may be configured to produce other optical effects.

The analog-to-digital converter (ADC) 130 converts the plurality of electrical signals, received from the pixel array 128 of the image sensor 126, from analog signals to digital signals (e.g., 8-bit digital values). The analog-to-digital converter 130 then passes the digital signals to the digital signal processor 122.

Image information is captured by the pixel array 128 of the image sensor 126 in sensor-specific frames. A frame of image information includes a set of simultaneously captured values for each distinct photosensor in the pixel array 128. Image frames captured by the pixel array 128 include data that represents features on the navigation surface 104. The rate of image frame capture and tracking resolution can be programmable.

A tracking engine (not shown) within the digital signal processor 122 compares successive image frames from the pixel array 128 to determine the movement of image features between frames. In particular, the tracking engine determines movement by correlating common features that exist in successive image frames generated by the pixel array 128. The movement between image frames is expressed in terms of movement vectors in, for example, X and Y directions (e.g., Δx and Δy). The movement vectors are then used to determine the movement of the optical mouse relative to the navigation surface.

After the digital signal processor 122 receives the digital form of the electrical signals from the analog-to-digital converter 130 of the image acquisition system 120, the digital signal processor 122 may perform additional processing using the digital signals. The digital signal processor 122 then transmits one or more signals to the microcontroller 110. Examples of types of signals transmitted from the digital signal processor 122 of the optical navigation circuit 108 to the microcontroller 110 include channel quadrature signals based on Δx and Δy relative displacement values. These signals, or other signals, may be indicative of a movement of the optical navigation device 102 relative to the navigation surface 104.

Alternatively, the quadrature or other signals may be indicative of a movement of the optical navigation device 102 relative to a distant object or surface in a free space navigation environment. Other embodiments of the digital signal processor 122 may transmit other types of signals to the microcontroller 110. In one embodiment, the microcontroller 110 implements a variety of functions, including transmitting data to and receiving data from a host computer system (not shown).

Figure 3:
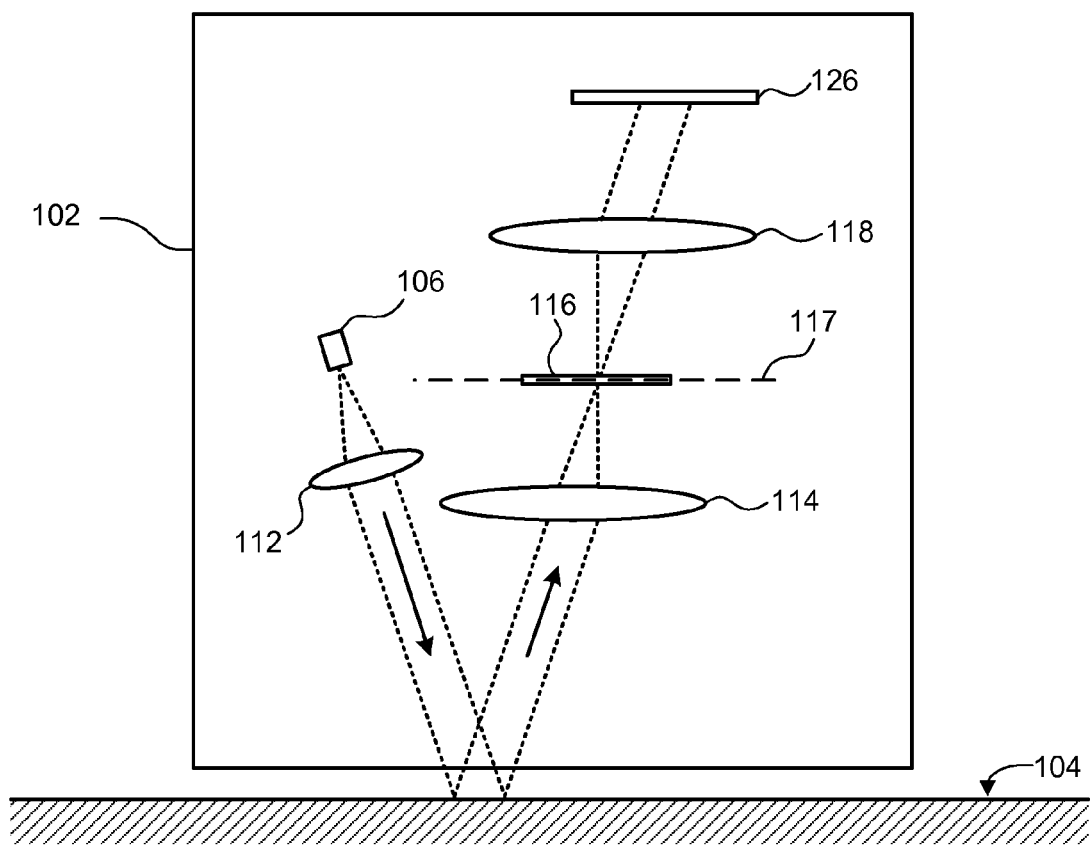
FIG. 3 depicts a schematic block diagram of another embodiment of the optical navigation device of FIG. 2.

FIG. 3 depicts a schematic block diagram of another embodiment of the optical navigation device 102 of FIG. 2. The illustrated embodiment the optical navigation device 102 includes the light source 106, the optical element 112, the optical element 114, the mask or the filter 116, an optical element 118, and the image sensor 126. Although a specific quantity, arrangement, and orientation of optical elements is shown and described herein, other embodiments may use a different quantity, arrangement, and/or orientation of the optical elements. For example, one or more of the optical elements 112, 114, and 118 may be oriented in non-parallel to the other optical elements and/or the navigation surface 104. The optical navigation device 102 is positioned adjacent to the navigation surface 104. In general, the light source 106 directs light to the navigation surface 104, and an imaging system modifies and directs the light from the navigation surface 104 to generate navigation signals.

In particular, the light from the light source 106 enters the optical element 112 which collimates and directs the light to the navigation surface 104. In other embodiments, the optical element 112 may produce other optical effects on the light from the light source 106. In some embodiments, the light from the light source 106 is collimated and the optical element 112 may be omitted. In some embodiments, the optical element 112 converges or diverges the light from the light source 106.

The navigation surface 104 reflects the light back into the optical navigation device 102. Some of the light is specular light, which could be high-intensity light that is reflected from the navigation surface 104 and which has few or no characteristics useable for tracking relative movement. Some of the light from the navigation surface 104 is scattered by surface imperfections, impurities, or other features of the navigation surface 104 that might be identified for tracking movement of the navigation surface 104 relative to the optical navigation device 102. The light from the navigation surface 104 impinges on the optical element 114. In some embodiments, the optical element 114 focuses the specular reflected light at approximately a plane 117 after the optical element 114 at approximately the mask 116. In one embodiment, the light out of the optical element 112 is collimated and the specular reflection is focused at or close to the focal plane of the optical element 114. In some embodiments, the location of the plane 117 is determined by the optical characteristics of the optical element 114 and the beam out of the optical element 112.

The mask 116 is located approximately at the plane 117 at which the cross section of the specular reflection is minimal. In other embodiments, the mask 116 is located within some distance (for example, 1 mm) of the plane 117. The mask 116 filters a majority of the specularly reflected light. The mask 116 also passes a significant amount of the scattered light scattered by surface imperfections, impurities, or other features of the navigation surface 104 which might be identified for tracking a movement of the navigation surface 104 relative to the optical navigation device 102.

In some embodiments, the scattered light passed by the mask 116 is directed to the optical element 118. The optical element 118 is configured to direct the scattered light from the mask 116 to the image sensor 126. In some embodiments, the optical element 118 is used to restore the beam characteristics similar to the ones before the optical element 114. In some embodiments the benefit of using two optical elements of 114 and 118 instead of only one optical element is to separate the filtering process that eliminates the specular reflection from the imaging process that forms the image of the navigation surface 104 onto the image sensor 126.

In general, the mask 116 reduces the average intensity of the reflected light at the image sensor 126. More specifically, the mask 116 reduces the intensity of the reflected light at the image sensor 126 by filtering out some or all of the specularly reflected light at the plane 117 before the light impinges on the image sensor 126. In some embodiments, the use of two optical elements of 114 and 118 facilitates reduction of an optical footprint of the mask 116 on the image formed on the image sensor 126. In some embodiments, the mask 116 is oriented parallel to the plane of incidence of the beam. Other embodiments may include other orientations of the mask 116.

As one example and on a navigation surface 104, the mask 116 may filter about 90% of the reflected light to be collected at the image sensor 126, so that about 10% of the reflected light is directed toward the image sensor 126. As another example and another navigation surface 104, the mask 116 may filter at least about 70% of the reflected light. In another example and depending on the navigation surface 104 and the properties of the optical elements 112, 114, and 118, the mask 116 may filter between about 10-99.9999% of the reflected light from the navigation surface 104.

At least one of the advantages of the mask 116 is that the package size of the optical navigation device 102 may be smaller because the image sensor 126 can be disposed in the path of the specular light reflected by the navigation surface 104. Because the mask 116 filters out substantially all of the specularly reflected light prior to the image sensor 126, the components of the optical navigation device 102 do not need to be removed from the specular reflection path to avoid saturating the image sensor 126 with specularly reflected light. Thus, the vertical height as well as the lateral dimensions of the optical navigation device 102 allow for a smaller package size.

Figure 4:
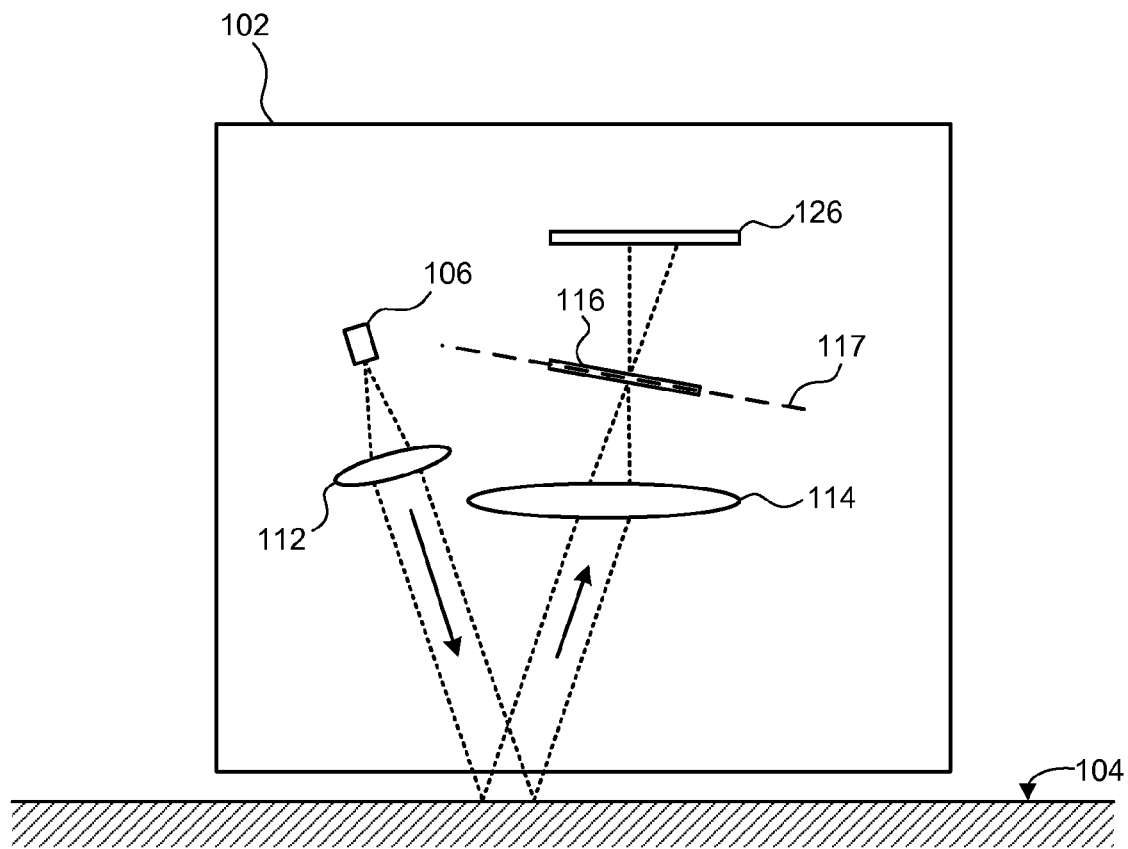
FIG. 4 depicts a schematic block diagram of another embodiment of the optical navigation device of FIG. 2.

FIG. 4 depicts a schematic block diagram of another embodiment of the optical navigation device 102 of FIG. 2. In the illustrated embodiment, the optical element 118 of FIG. 3 is omitted. In this embodiment, the optical element 114 focuses the specular light reflected from the navigation surface 104 to a plane 117 after the optical element 114 and before the image sensor 126 and directs the light to the mask 116. In some embodiments that the specular reflection is collimated, the plane 117 is at or close to the Fourier or focal plane of the optical element 114. The mask 116 filters the light at approximately the plane 117 as described above. The rest of the light that is not filtered will pass the mask 116 and will reach the image sensor 126. Omitting the optical element 118 enables a smaller package size than optical navigation devices in which the optical element 118 is included (refer to FIG. 3). The imaging of the navigation surface 104 to the imaging sensor 126 is achieved with the optical element 114. In other words, optical element 114 simultaneously focuses the specular reflection at the mask 116 and collects the scattered light at the imaging sensor 126 to form the image of the navigation surface 104.

Additionally, FIG. 4 illustrates an embodiment which includes the plane 117 oriented substantially orthogonal to the main direction of the incident light from the optical element 114. In some embodiments, the mask 116 is parallel with the plane 117 and also oriented orthogonal to the main direction of the incident light from the optical element 114. Other embodiments may include other orientations of the plane 117 and the mask 116 relative to the incident light from the optical element 114. In other embodiments, the mask could be realized on a non-flat or a curved surface since it only needs to filter out the specular reflection at its small cross section.

Figure 5A:
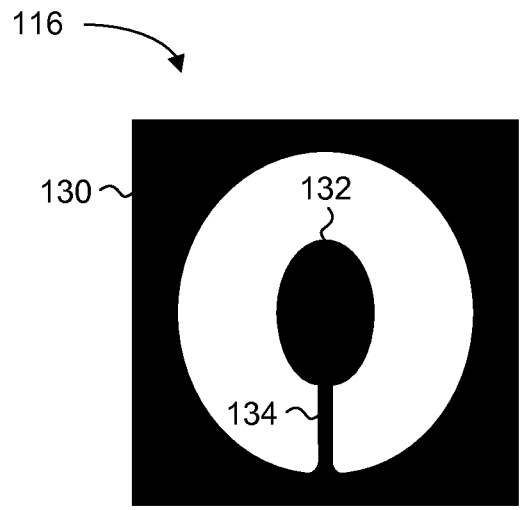
FIGS. 5a-c depict schematic diagrams of some embodiments of a mask used to filter out specularly reflected light.
Figure 5B:
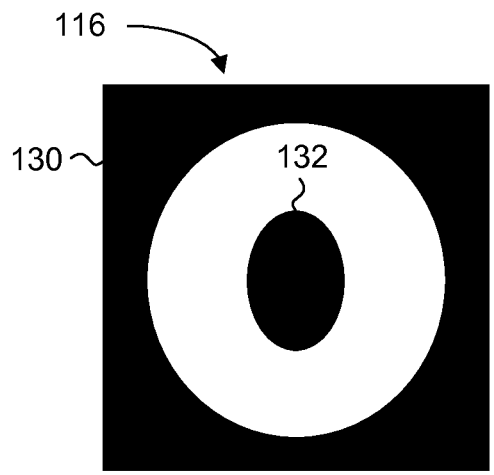
Figure 5C:
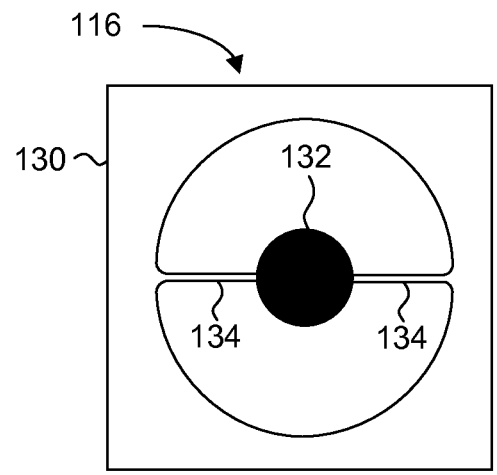

FIGS. 5a-c depict schematic diagrams of some embodiments of a mask 116. FIG. 5a depicts an embodiment of the mask 116 which includes a base 130, a stop 132, and a spoke 134. In the illustrated embodiment, the mask 116 is formed with non-transparent material. The optical stop 132, or stop 132, is suspended within a central aperture by the spoke 134. In this embodiment, the stop 132 is immediately surrounded, with exception of the spoke 134, by the aperture to allow some of the scattered light to pass through the mask 116. The stop 132 is shown with an elliptical geometry because, in some embodiments, the specular light focused at or near the mask 116 might not have a circular cross section. Other embodiments of the mask 116, the aperture, and/or the stop 132 have other geometries (e.g. circular, rectangular, etc.). For all those geometries, the stop 132 blocks most or all of the specular light while, depending on its geometry, it filters a portion of the scattered light.

The spoke 134 mechanically supports the stop 132 relative to the base 130. The spoke 134 may be designed to have a small or minimal effect on the scattered light passed by the mask 116. In some embodiments, the base 130, stop 132, and spoke 134 of the mask 116 are made of a single, non-transparent material. Other embodiments may use multiple materials in the structure of the mask 116 to improve the performance of the individual components of the mask 116. The spoke 134 may be made of a high strength material to minimize size while providing mechanical support to the stop 132 to reduce or minimize the optical effect of the spoke 134. In other embodiments, the spoke might have a thickness different than the stop to improve its mechanical strength. Alternatively, the spoke 134 may also be made of a heat conductive material to transfer heat away from the stop 132. The stop 132 may be made of absorptive, reflective, or refractive material to filter the specularly reflected light from the navigation surface 104. In other embodiments, the stop 132 maybe formed in a configuration stage by applying a photoresist to the mask 116 and exposing the area of the stop 132 to light at an intensity beyond the threshold of normal operation. In response, the photoresist forms the stop 132 suitable for normal operation.

In some embodiments, multiple spokes 134 may be included to mechanically support the stop 132. Multiple spokes 134 around the stop 132 may allow for smaller individual spokes 134 to reduce the local blockage of the scattered light at the mask. Additionally, the spokes 134 may be placed at various angles and positions within the aperture of the mask 116.

FIG. 5b illustrates another embodiment of the mask 116. In the illustrated embodiment, the mask 116 includes a base 130 and a stop 132. In this embodiment, the base 130 is a transparent material with low optical absorption. The illustrated base 130 does not include any aperture portions removed from the base 130. The aperture portion is formed by disposing non-transparent portions to allow light to pass through the remaining transparent portions. In the illustrated embodiment, the stop 132 is non-transparent material disposed at the base 130. In some embodiments, the stop 132 is printed onto the base 130. In other embodiments, the stop 132 is chemically applied to the surface of the base 130 or through at least a portion of the thickness of the base 130. In another embodiment, the stop 132 is molded or inserted into the base 130. In yet another embodiment, the stop 132 is formed by application of a photoresist as described above with respect to FIG. 5a. Other embodiments may include other processes for disposing the stop 132 relative to the transparent base 130. In the illustrated embodiment, the base 130 is a transparent substrate with a non-transparent portion around the edge to form an aperture around the stop 132. In some embodiments, the transparent aperture is separately or simultaneously formed in the base 130 and/or around the stop 132. In other embodiments, the aperture is enclosed in a non-transparent housing or other component of the optical navigation device 102 which forms the outer edge around the aperture. Other embodiments may use other configurations to provide the illustrated geometry. In some embodiments, the stop 132 is centered relative to the base 130. In other embodiments, the stop 132 may be tilted or at other orientations relative to the base 130. In some embodiments, the stop 132 might have some thickness. In other embodiments, the stop 132 might be non-flat or curves. In some embodiments, the transparent base might have some thickness. In some embodiments, the transparent based might be non-flat or curves. In some embodiments, the stop 132 might have different geometries. In some embodiments, the transparent portion of mask 130 might have different geometries. Yet in other embodiments, other differences in the optical properties of the base 130 and the stop 132 might be used to separate the specular reflection from the scattered portion of the reflection light form the navigation surface 104.

FIG. 5c illustrates another embodiment of the mask 116. In the illustrated embodiment, the base 130 is a transparent material with transparent spokes 134 to support the stop 132. In the illustrated embodiment, the stop 132 is round. In other embodiments, the stop 132 may have other geometries. In some embodiments the stop 132 is disposed through printing, molding, chemical deposition, etc. In some embodiments, the base 130 is a non-transparent material while the spokes 134 are a transparent material. In some embodiments the base 130 is a transparent material while the spokes 134 are a separate structural material. Other embodiments may include other combinations of materials or processes or shapes of forming the components of the mask 116.

Figure 6:
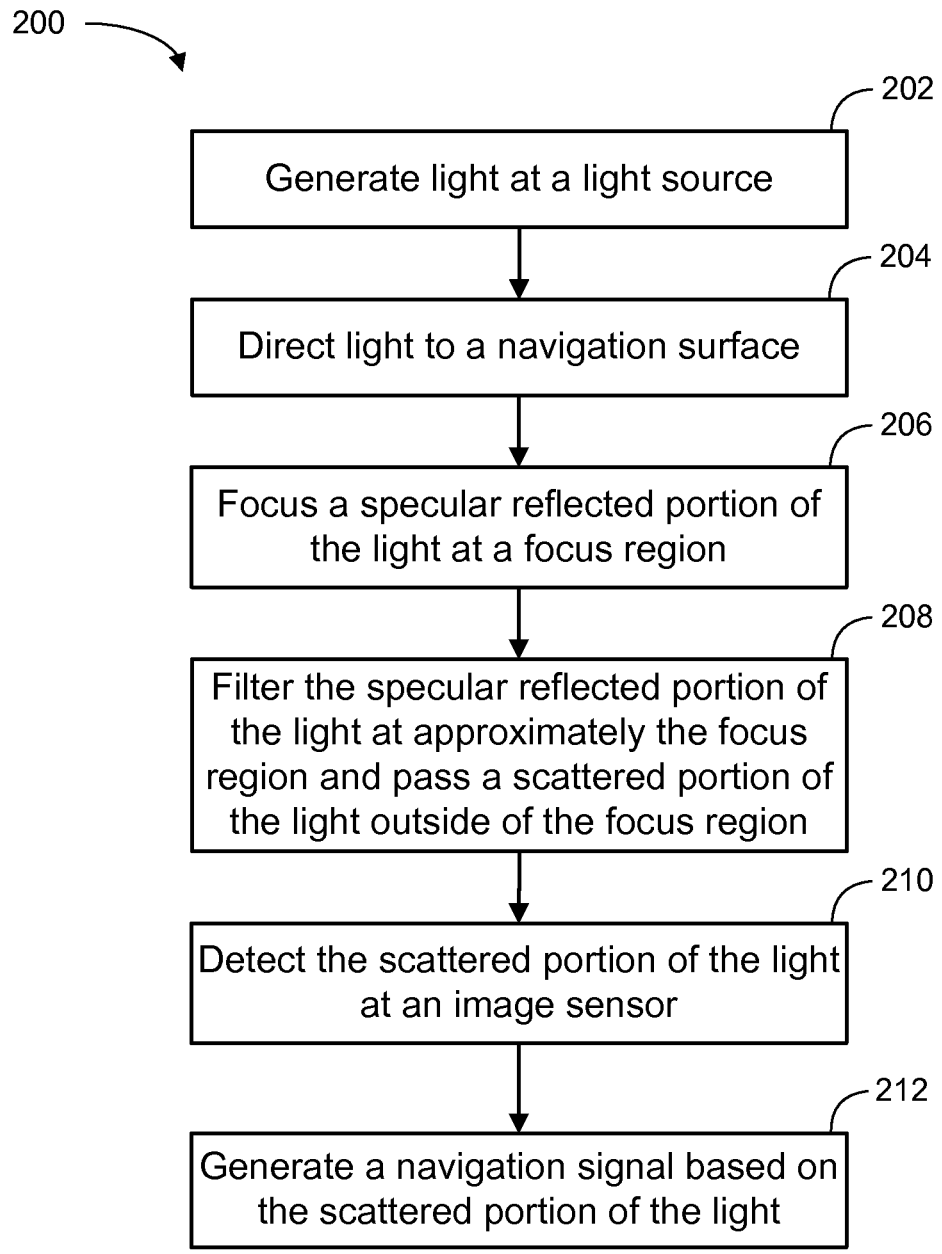
FIG. 6 depicts a schematic flow chart diagram of one embodiment of a method for using the optical navigation system of FIG. 2.

FIG. 6 depicts a schematic flow chart diagram of one embodiment of a method 200 for using the optical navigation device 102 of FIG. 2. Although the method 200 is described in conjunction with the optical navigation device 102 of FIG. 2, embodiments of the method 200 may be implemented to make other types of optical navigation devices.

In the illustrated method 200, at block 202, light is generated at the light source 106. At block 204, light is directed to the navigation surface 104. At block 206, a specular reflected portion of the light is focused at a focus region. At block 208, the specular reflected portion of the light is filtered at approximately the focus region and a scattered portion of the light is passed outside of the focus region. At block 210, the scattered portion of the light is detected at an image sensor 126. At block 212, navigation information is generated based on the scattered portion of the light. The depicted method 200 then ends.

Figure 7:
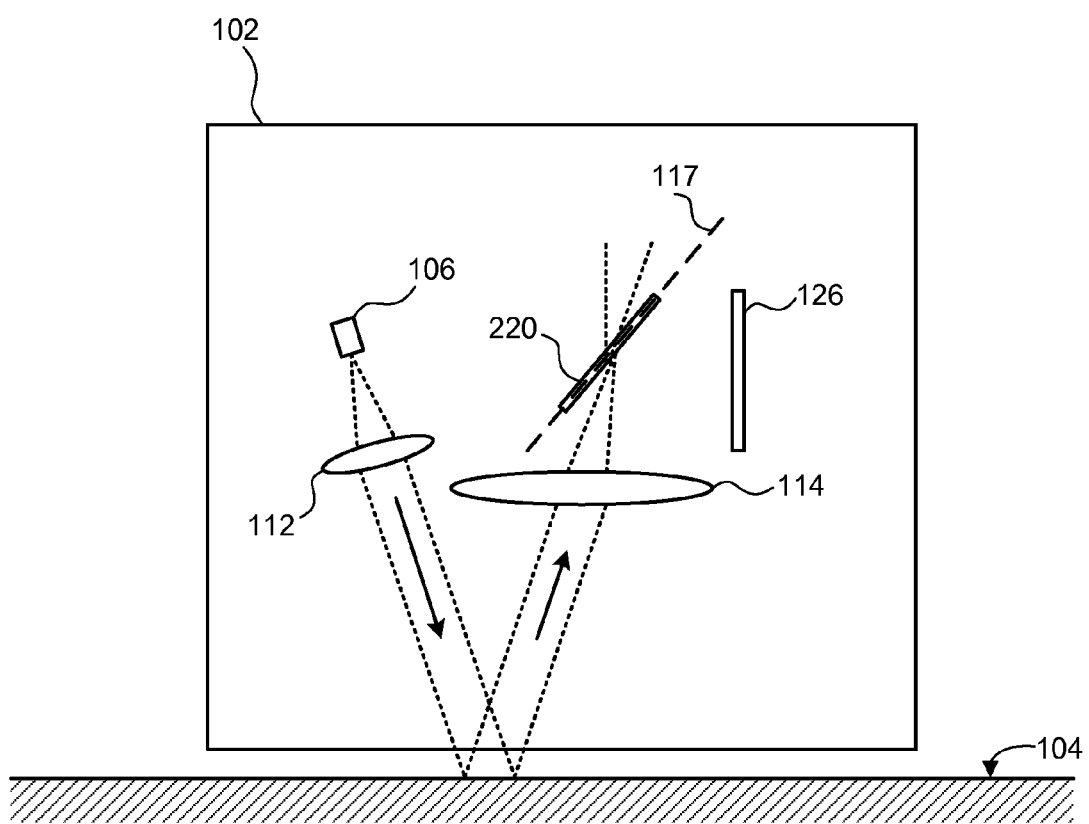
FIG. 7 depicts a schematic block diagram of another embodiment of the optical navigation device which uses a mirror to filter out the specular portion of the reflected light.

FIG. 7 depicts a schematic block diagram of another embodiment of the optical navigation device 102 which uses a mirror 220 to filter out the specular portion of the reflected light. Instead of using an opaque mask to block light at the focus region, the mirror 220 has a hole that is approximately aligned with the focus region. The hole in the mirror 220 allows the specular portion of the reflected light to pass through the mirror 220, which the remaining scattered light (not shown) is redirected toward the image sensor 126. In this embodiment, the image sensor 126 is not located in the path of the specular portion of the reflected light. In an alternative embodiment, the mirror 220 could have the reflective area only around the focus region and redirect the specular portion of the reflected light, while the scattered portion of the reflected light passes to an image sensor 126 located as shown in FIG. 4.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for optical navigation, the system comprising:
a light source to illuminate a navigation surface, wherein the navigation surface reflects light from the light source; and
an imaging system located approximately within a path of the reflected light, the imaging system comprising:
a lens to receive the reflected light from the navigation surface, wherein the lens is configured to focus a specular portion of the reflected light to a focus region;
a mask at approximately the focus region, the mask configured to filter out substantially all of the specular portion of the reflected light and pass at least some of a scattered portion of the reflected light outside of the focus region, wherein the mask is located within 1 mm of the focus region, and wherein the focus region is located on a plane at which the cross section of the specular portion of the reflected light is minimal; and
an image sensor to generate a navigation signal based on the scattered portion of the reflected light that passes outside the focus region and is incident on the image sensor.

2. The system of claim 1, wherein the mask comprises a non-transparent optical stop disposed at approximately the focus region.

3. The system of claim 2, wherein the non-transparent optical stop is mechanically supported by one or more structural spokes.

4. The system of claim 2, wherein the non-transparent stop is disposed at a transparent substrate.

5. The system of claim 1, wherein the mask is oriented orthogonal to a main direction of travel of the reflected light incident at the mask.

6. The system of claim 1, wherein the mask is parallel to the navigation surface.

7. An apparatus for filtering light for optical navigation, the apparatus comprising:
a lens configured to focus a specular portion of the light to a focus region;
a mask at approximately the focus region, wherein the mask is configured to filter out substantially all of the specular portion of the light and pass at least some of a scattered portion of the light outside of the focus region, wherein the mask is located within 1 mm of the focus region, and wherein the focus region is located on a plane at which the cross section of the specular portion of the reflected light is minimal; and
an image sensor to generate a navigation signal based on the scattered portion of the light that passes outside of the focus region and is incident on the image sensor.

8. The apparatus of claim 7, wherein the mask comprises a non-transparent optical stop disposed at approximately the focus region, the non-transparent optical stop configured to stop specular light.

9. The apparatus of claim 8, wherein the non-transparent optical stop is mechanically supported by one or more structural spokes.

10. The apparatus of claim 8, wherein the non-transparent optical stop is disposed at a transparent substrate.

11. The apparatus of claim 7, wherein the mask is oriented orthogonal to a main direction of travel of the light incident at the mask.

12. The apparatus of claim 7, wherein the mask is parallel to a navigation surface.

13. A method for optical navigation, the method comprising:
generating light at a light source;
directing the light to a navigation surface;
focusing a specular reflected portion of the light at a focus region;
filtering out the specular reflected portion of the light at approximately the focus region and passing a scattered portion of the light to an image sensor, wherein the scattered portion of the light is outside of the focus region, wherein the focus region is located on a plane at which the cross section of the specular portion of the reflected light is minimal and the filtering occurs within 1 mm of the focus region;
detecting the scattered portion of the light at the image sensor; and
generating a navigation signal based on the scattered portion of the light.

14. The method of claim 13, wherein filtering out the light comprises stopping substantially all of the specular reflected portion of the light at an optical stop disposed at approximately the focus region.

15. The method of claim 14, wherein the optical stop is mechanically supported by one or more structural spokes.

16. The method of claim 14, wherein the optical stop is absorptive.

17. The method of claim 14, wherein the optical stop is reflective.

18. The method of claim 13, wherein:
filtering out the specular reflected portion of the light comprises passing the specular reflected portion of the light through a hole in a mirror; and
passing the scattered portion of the light comprises reflecting the scattered portion of the light off of the mirror toward the image sensor.

* * * * *